United States Patent

Schwarz

[15] 3,659,184

[45] Apr. 25, 1972

[54] ANALOG SIGNAL TO DISCRETE TIME INTERVAL CONVERTER (ASDTIC)

[72] Inventor: Francisc C. Schwarz, Concord, Mass.

[73] Assignee: The United States of America as represented by the Administrator of the National Aeronautics and Space Administration

[22] Filed: Feb. 11, 1970

[21] Appl. No.: 10,329

[52] U.S. Cl. ....................................321/2, 307/261, 321/18

[51] Int. Cl. ........................................................H02m 3/22

[58] Field of Search .................307/260, 261, 265; 321/2, 18

[56] References Cited

UNITED STATES PATENTS

| | | | |
|---|---|---|---|
| 3,187,269 | 6/1965 | Runyan | 307/261 X |
| 3,303,405 | 2/1967 | Schwarz | 321/2 |
| 3,341,765 | 9/1967 | Rodgers, Jr. et al. | 321/2 |
| 3,325,716 | 6/1967 | Gomi | 321/2 |
| 3,343,062 | 9/1967 | Mesenhimer | 321/2 |
| 3,373,334 | 3/1968 | Geisz et al. | 321/2 |
| 3,535,556 | 10/1970 | Hall | 307/261 |

*Primary Examiner*—William M. Shoop, Jr.
*Attorney*—John R. Manning, N. T. Musial and J. A. Mackin

[57] ABSTRACT

An electronic signal conversion device is disclosed. The concept of pulse modulation includes in the sense of this invention the process of sampling a source of electric energy by one or several switches, and the electronic function that controls this switch or switches; any utilization of averaging devices to smooth the ensuing pulses such as filters are excluded as part of this process, except that a filter may be inserted ahead of a lead to be energized. The device is particularly useful wherever conversion of analog signals to discrete time signal intervals for purpose of pulse modulation is required. However, the invention has general utility and is presently being used with specific power supplies in the space program and communication technology. In addition, the device lends itself to incorporate a reference source and feedback network as used with power amplifiers and direct current pulse modulated power converters. The device maintains its accuracy of expected operation notwithstanding variations in its component characteristics, variations of applied voltage waveforms and supply voltages.

14 Claims, 14 Drawing Figures

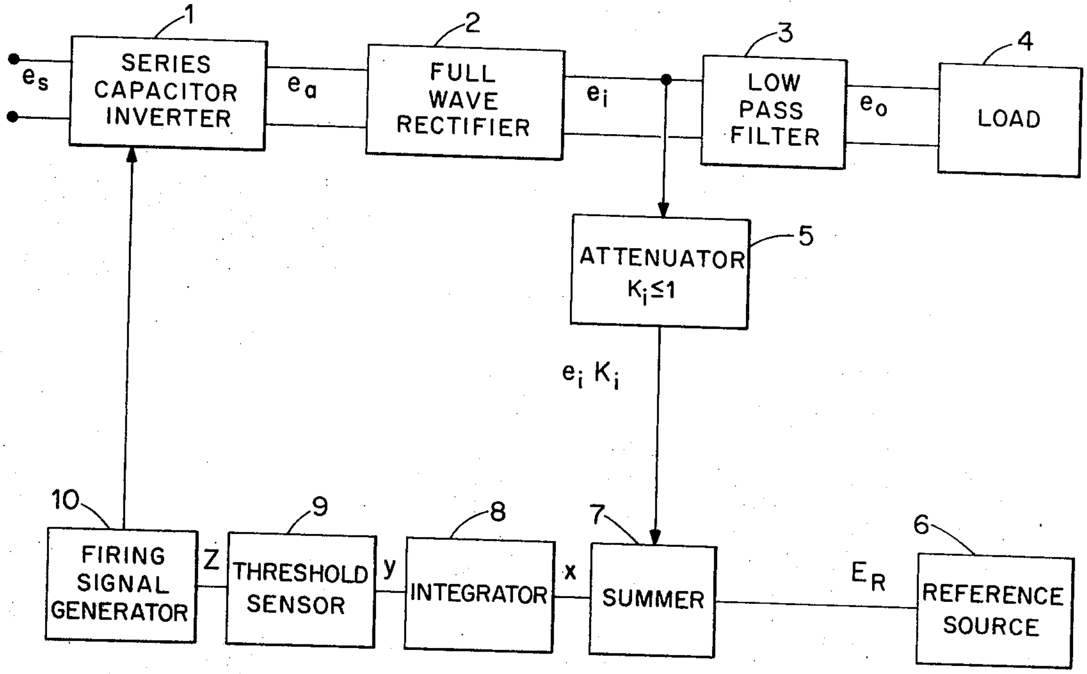
Fig. 1.
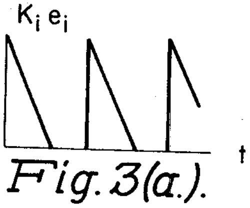
Fig. 3(a.).
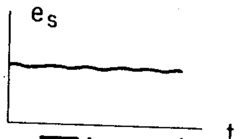
Fig. 2(a.).
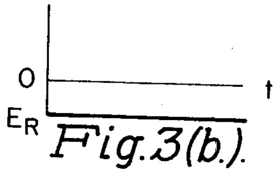
Fig. 3(b.).
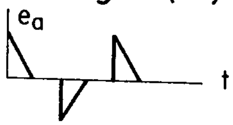
Fig. 2(b.).
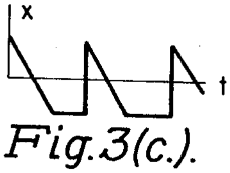
Fig. 3(c.).
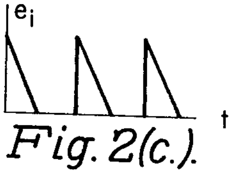
Fig. 2(c.).
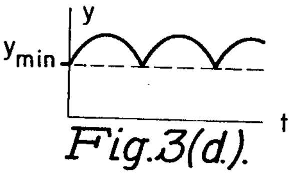
Fig. 3(d.).
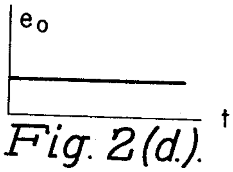
Fig. 2(d.).
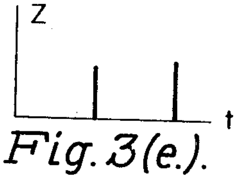
Fig. 3(e.).
INVENTOR
FRANCISC C. SCHWARZ
BY Ottawa Coy
Herbert E. James
ATTORNEYS

INVENTOR
FRANCISC C. SCHWARZ
BY
ATTORNEYS

INVENTOR
FRANCISC C. SCHWARZ

ANALOG SIGNAL TO DISCRETE TIME INTERVAL CONVERTER (ASDTIC)

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to electronic devices for conversion of analog signals to discrete time intervals for control of pulse modulators, and, more particularly, to an electronic device capable of maintaining its accuracy of operation notwithstanding variations in operating frequency and variations in environmental conditions and aging.

Integrators to be used wherever conversion of analog signals to discrete time intervals is required are well known in the art. One such integrator is the saturable magnetic reactor. This nonlinear device is, ideally, a device with two distinct states. In one of these states its core is not magnetically saturated and it imposes a substantial impedance to the flow of current in the associated circuity. Its impedance is, however, virtually reduced to zero when its magnetic core is saturated. Saturable reactors are not well suited for high frequency applications because of parasitic circuit parameters associated with wire wound electromagnetic devices, and the accuracy of saturable reactors suffers from variation of their magnetic characteristic as a function of core temperature.

Another type of integrator widely used for conversion of analog signals to discrete time intervals is the electronic integrator, usually an RC integrator. The volt-seconds to time interval conversion of the RC integrator is dependent on the invariance of component characteristics due to variations in environmental conditions, including ambient temperature and aging of components. The conversion is also usually dependent on voltage waveforms and accurate maintenance of certain circuit potentials. The accuracy of conversion is also usually dependent on the frequency of operation of the signal conversion device, because the effect of the relatively fixed errors that are introduced in the time intervals needed for the performance of switching operations in the control of electronics and the associated pulse modulation circuits introduces distortions in the pulse modulation process which are proportional to the variations of the frequency of operation.

For certain high frequency and variable frequency applications where the saturable magnetic reactor is not well suited, the RC integrator is also not the ideal type integrator because of its conversion dependence on environmental conditions and invariant frequency. Therefore, in high frequency applications where a high degree of accuracy of operation notwithstanding variations in environmental conditions and variations in frequency is desired, some device other than the conventional RC integrator and the associated conventional analog signal to discrete time interval conversion circuits must be utilized.

SUMMARY OF THE INVENTION

This invention provides a converter of analog signal to discrete time intervals (ASDTIC) for pulse modulators that affords accuracy of operation regardless of changes in frequency of operation and changes in environmental conditions and aging of circuit components. In addition the invention lends itself to incorporate a feedback network as used with direct current pulse modulated power converters and provides a feedback system with significantly higher static and dynamic stability than the known conventional systems.

It is, therefore, an objective of this invention to provide an auto-compensated electronic device for conversion of analog signals to discrete time intervals for control of pulse modulators.

Another object of this invention is to provide an electronic device for conversion of analog signals to discrete time intervals for control of pulse modulators.

A further object of this invention is to provide an electronic device for conversion of analog signals to discrete time intervals for control of pulse modulators capable of maintaining its accuracy of operation notwithstanding variations in frequency of operation and variations in environmental conditions and aging of components.

A still further object of the invention is to provide an electronic device for conversion of analog signals to discrete time intervals for pulse modulators incorporating a feedback network with inherent greatly improved static and dynamic stability for closed loop control of DC converters.

Yet another object of the invention is to provide an electronic device for conversion of analog signals to discrete time intervals for pulse modulators which reject steady state and transient input voltage variations such as line voltage ripple entirely without recourse to passive low pass filters for this purpose.

BRIEF DESCRIPTION OF THE DRAWINGS

The above mentioned and other objects of the invention will become apparent from the following detailed description of the invention when read in conjunction with the annexed drawing in which:

FIG. 1 is a block diagram of a preferred embodiment of the invention as it is utilized with a series capacitor inverter-converter for the purpose of DC conversion;

FIGS. 2(*a*) through 2(*d*) show voltage shapes at various points in the power circuit indicated with the block diagram of FIG. 1;

FIGS. 3(*a*) through 3(*e*) show voltage wave shapes in the control circuit indicated in the block diagram of FIG. 1;

DESCRIPTION OF THE PREFERRED EMBODIMENT

Figure 6:
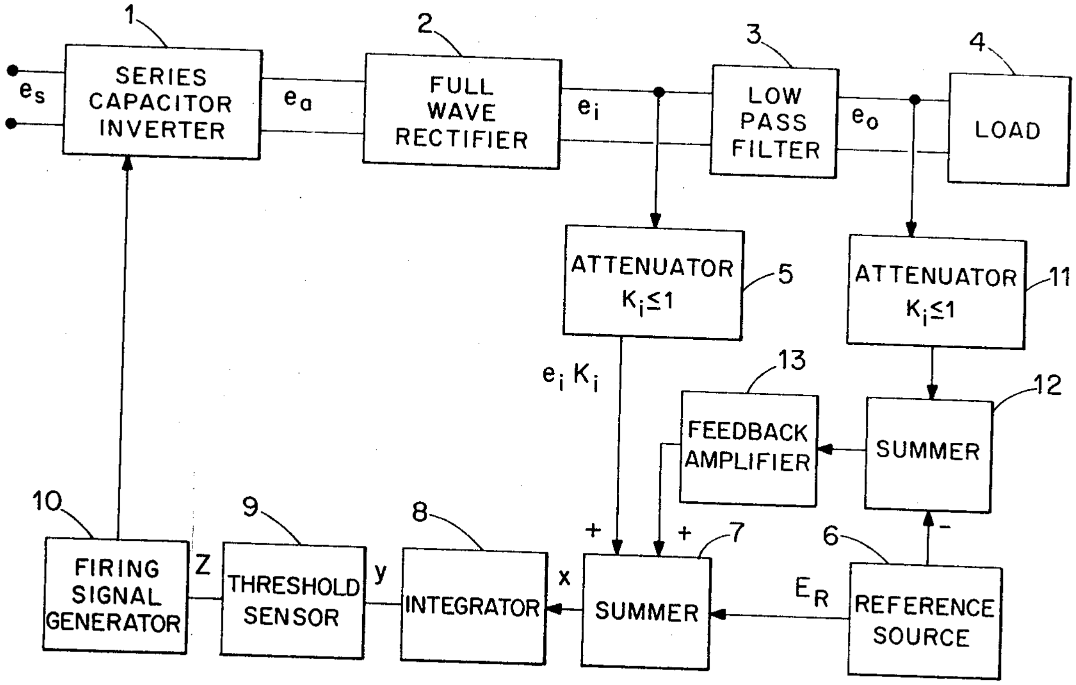
FIG. 6 is a block diagram of another embodiment of the invention as it is utilized with a series capacitor inverter-converter incorporating closed loop control for purpose of a DC converter.

The invention will be described as it is applied with a series capacitor inverter-converter as shown in FIGS. 1 and 6. However, the invention is not restricted to this use. It is readily applied to other types of pulse modulators, such as series choppers, pulse modulated parallel inverters, series inductor converters and any other form of pulse modulators. Series capacitor inverters are well known in the art. See for example, "-Frequency Modulated Series Inverter," U.S. Pat. No. 3,303,405, 1967; Bedford, B.D. and Hoft, R.G. "Principles of Inverter Circuits," Wiley, New York, 1964; Silicon Controlled Rectified Manual, General Electric Company, 2nd Edition, 1961.

Referring now specifically to FIG. 1, input signals $e_s$ are applied to a series capacitor inverter 1. The output from the inverter 1 is applied to a full wave rectifier 2 and the output from the rectifier is applied to a low pass filter 3. The output of the filter 3 is connected to a load 4. The circuits just described form a power circuit and the voltage waveshape at various points in this circuit are shown in FIGS. 2(*a*) through 2(*d*).

Voltage source $e_s$ is an unregulated voltage source as shown in FIG. 2(*a*). This unregulated voltage source is sampled and transformed into a balanced AC waveform $e_a$ by the inverter 1 as shown in FIG. 2(*b*). The triangular waveshapes are rectified by the full wave rectifier 2 to form a train of unipolar triangles $e_t$ as shown in FIG. 2(*c*). The unipolar triangles are filtered by the low pass filter 3 to obtain the desired DC voltage $e_o$ as shown in FIG. 2(d).

The shape of the voltage triangles is determined by the circuit design parameters. However, the repetition rate is determined by the control circuit which constitutes the balance of the circuitry of FIG. 1.

An attenuator 5 is connected to the output of the full wave rectifier 2. The output from the attenuator 5 and a reference source 6 are algebraically summed in a summer circuit 7. The output of the summer 7 is integrated by an integrator 8 and the output of the integrator is applied to a threshold sensor 9. The output of the threshold sensor 9 is applied to a firing generator 10 which in turn, as will become apparent later, controls the operation of the inverter 1.

FIGS. 3(*a*) through 3(*e*) show the voltage waveforms that appear at various points in the control circuit just described. The attenuator 5 is designed so that a constant proportion $k_l$ of the average of the voltage waveform $e_l$ is equal to the magnitude of the reference source $E_R$. The output $k_l e_l$ of attenuator 5 is shown in FIG. 3(*a*). The reference voltage $-E_R$, shown in FIG. 3(*b*) and the output $k_l e_l$ of the attenuator are algebraically summed to produce the waveform $x$ shown in FIG. 3(*c*). This waveform $x$ is then integrated by the integrator 8 to produce the waveform $y$ shown in FIG. 3(*d*).

The threshold sensor 9 which may be a well known type of multivibrator or other common type of sensor is so designed that it produces an output when the waveform $y$ is at an arbitrary minimum ($y$ min) well within the linear range of operation of integrator 8. This fact is shown in FIG. 3(*e*) which shows narrow pulses produced at the times that waveform $y$ of FIG. 3(*d*) is at $y$ min. The narrow pulses of FIG. 3(*e*) actuate the signal generator which at that instant energizes a switching device in the inverter 1 to initiate another cycle of operation. In other words the inverter is actuated to initiate another cycle of operation each time the threshold sensor 9 produces an output pulse. The inverter 1 at this time produces another triangle and comes to rest by itself until the next pulse is produced by the sensor 9. Thus, it is apparent that the circuitry just described controls the cycle of operation of the power circuitry of FIG. 1.

Figure 4:
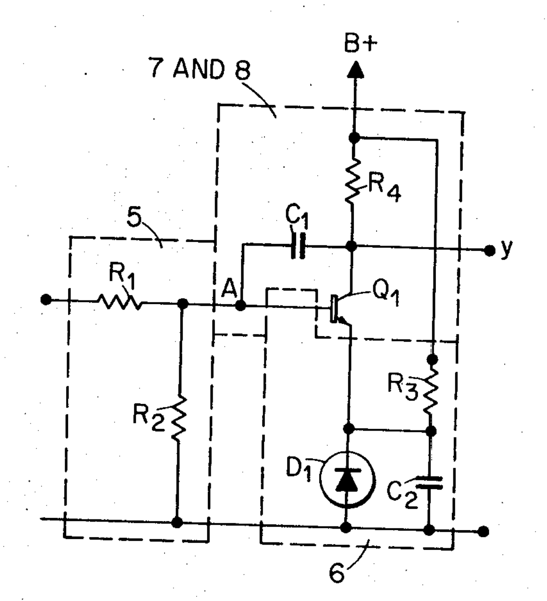
FIG. 4 is a schematic diagram of the apparatus of the invention.

FIG. 4 is a schematic diagram of the basic invention. The circuitry shown in FIG. 4 corresponds to the attenuator 5, the reference source 6, the summer 7 and the integrator 8 of FIG. 1. The attenuator 5 comprises a pair of resistors $R_1$ and $R_2$. The reference source comprises a capacitor $C_2$, a resistor $R_3$, a Zener diode $D_1$ and the base of a transistor $Q_1$. The summer and integrator comprise the transistor $Q_1$ and associated components capacitor $C_1$ and resistor $R_4$. The summing, of course, takes place in the base circuitry of the transistor $Q_1$. From the circuitry of FIG. 4 it is apparent that the transistor $Q_1$ is part of an operational amplifier or integrator. The combination of the Zener diode $D_1$ and the operational amplifier is available on the commercial market under the name "Reference Amplifier." The operation of this circuitry has been described with reference to FIG. 1 and a further discussion of the operation is not necessary. However, it should be pointed out that the average current at the point labeled A in FIG. 4 is almost zero except for the continuous base current $i_b$ for transistor $Q_1$. This base current $i_b$ varies with temperature and with age of the transistor $Q_1$. But if this base current is very small compared to the root mean square value $i_{crms}$ of the integrator (capacitor) current $i_c$ such that the ratio of the maximum variation $\Delta i_b$ of $i_b$ to $i_{crms}$, that is $\Delta i_b / i_{crms} \approx 0$, then the average integrator current will be essentially zero and will not vary due to aging of the components or variations in the ambient temperature as long as operation of the converter shown in FIG. 1 is maintained. To maintain an average zero current into point A is equivalent to maintain equal volt-second areas for signals $k_l e_l$ and $E_R$ which in turn is equivalent to maintain $e_l$ and $E_R$ at fixed ratio. This fixed ratio causes maintenance of a fixed input voltage to low pass filter 3 independent of variations of $e_s$ or in any of the components of the power or control circuits.

Figure 7:
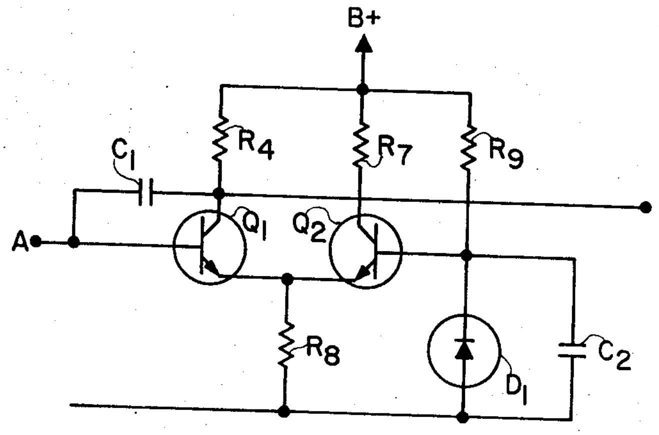
FIG. 7 is a schematic diagram of the circuitry of FIG. 5 as modified to incorporate a differential amplifier.

Referring to FIG. 7, the above described operational amplifier - reference source combination can be equivalently implemented by use of a common differential amplifier consisting of at least two transistors, two collector resistors and a common emitter, resistor; the base electrode of the first transistor $Q_1$ is connected to the output terminal of said voltage divider consisting of resistors $R_1$ and $R_2$, and simultaneously to one terminal of capacitor $C_1$; the other terminal of capacitor $C_1$is connected to the collector of the first transistor $Q_1$ such that the input stage to the differential amplifier forms an operational amplifier, analogous to the one previously described above. The base electrode of the second transistor $Q_2$ of the differential amplifier is connected to the reference Zener diode $D_1$ previously connected to the emitter of transistor $Q_1$; the Zener diode is paralleled by capacitor $C_2$ and this parallel combination is powered from the common source of DC control power (B+) through resistor $R_3$ as previously described with reference to the embodiment depicted in FIG. 4. In essence, the shunt combination of operational amplifier and Zener reference source is replaced by a succession of differential-operational amplifiers and a Zener reference source to achieve the same purpose as readily implementable by those skilled in the art.

Figure 5:
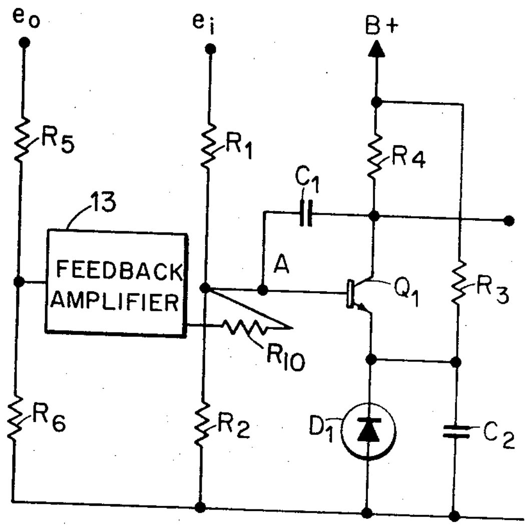
FIG. 5 is a schematic diagram of another apparatus of the invention for closed loop control of a DC converter.

The circuitry of FIG. 4 can readily be expanded for closed loop control of the voltage of a DC converter. Only three resistors, $R_{10}$ $R_5$ and $R_6$ and one feedback amplifier 13, as shown in FIG. 5, need to be added to the circuit of FIG. 4 for closed loop control of the voltage of a DC converter as known in the art. The feedback amplifier 13 could be a saturable impedance matching device with unity gain, or in the limiting case a solid connection between the output terminals of the two resistive dividers shown in FIG. 5.

In this case, the circuitry of FIG. 5 is identical to the circuitry of FIG. 4 except that the two resistors $R_5$ and $R_6$ have been added to the circuitry of FIG. 4. The resistors $R_5$ and $R_6$ form a voltage divider.

This divider is so designed that:

$$E_0 = \frac{R_6}{R_5 + R_6} = E_R$$

where $E_o$ is the nominal DC output voltage of the converter system. If the actual output voltage $e_o \neq E_o$ the deviation can be expressed by:

$\epsilon \triangleq e_o - E_o$ The error signal $\epsilon$ will cause a flow of current ($i_f$) into the input terminal of the operational amplifier. This current flow can be expressed as:

$$i_f = \epsilon / R_5$$

since point A remains at a potential $E_R$ independent of variations of $e_o$, as being an inherent property of this converter. If the charge $q_R$ flowing during one cycle duration ($T_o$) out of junction A due to the presence of potential $E_R$ is expressed as:

$$q_R = -\frac{E_R}{R} T_0$$

and the charge $q_f$ flowing into capacitor $C_1$ due to the error during the same interval $T_o$ is expressed as:

$$q_f = \frac{\epsilon}{R_5} T_0$$

then the gain of the feedback mechanism is expressed as the ratio:

$$A = \left| \frac{q_f / q_R}{\epsilon / E_R} \right| = \frac{R}{R_5}$$

where $R$ is the Thevenin equivalent of the attenuator 7, or $R = R_1 R_2 / (R_1 + R_2)$. Thus, it is obvious that error detection and amplification to control a closed loop DC converter system can be accomplished by the use of the circuit of FIG. 5, when incorporated in the converter as shown in FIG. 6.

While the invention has been described with reference to specific preferred embodiments, it will be obvious to those skilled in the art that the invention has broad utility, and can be used for control of many types of pulse modulators, such as series chopper regulators, series inductor converters, pulse modulated parallel inverters-converters and other converters which utilize pulse modulation.

What is claimed is:

1. A control circuit for a power pulse modulator comprising:

a reference source;

a summer circuit;

means to couple the output of said reference source to said summer circuit;
means for coupling an attenuated, undistorted replica of the output voltage waveform of said power pulse modulator to said summer circuit;
an integrator coupled to the output of said summer circuit;
a threshold sensor coupled to the output of said integrator;
a signal generator coupled to the output of said threshold sensor; and
means to couple the output of said generator to said power pulse modulator to energize said modulator in response to an output signal from said generator.

2. A control circuit as defined in claim 1 wherein:
a first resistor is connected to the output of said power pulse modulator and to the output terminal of said attenuator;
a second resistor is connected to said output terminal of said attenuator and to the reference terminal of the power pulse modulator; and
the common reference nodes of said power pulse modulator and of said control circuit are connected.

3. A control circuit as defined in claim 1 wherein said integrator is an amplifier type integrator having an input, an output and a reference node.

4. A control circuit as defined in claim 3 where said reference source comprises:
a Zener diode connected to the reference node of said amplifier type integrator and to the common reference node of said control circuit;
a capacitor connected to the reference node of said amplifier type integrator and to the common reference node of said control circuit; and
a resistor connected to the reference node of said amplifier type integrator and to the power supply of said control circuit.

5. A control circuit for a power pulse modulator comprising:
an attenuator coupled to the output of said power pulse modulator;
a d-c reference source;
a summer circuit;
means to couple the output of said attenuator and said reference source to said summer circuit;
an integrator coupled to the output of said summer circuit;
a threshold sensor coupled to the output of said integrator;
a signal generator coupled to the output of said threshold detector;
means to couple the output of said generator to said power pulse modulator to energize said modulator in response to an output signal from said generator;
said integrator comprising;
a transistor having an emitter electrode, a base electrode and a collector electrode;
a Zener diode connected between said emitter electrode and a point of reference potential;
a first capacitor connected between said emitter electrode and said point of reference potential;
a first resistor connected between said emitter electrode and a source of positive potential;
a second capacitor connected between said collector electrode and said base electrode; and
a second resistor connected between said collector electrode and said source of positive potential.

6. An autocompensated integrator and its reference source comprising:
a transistor having an emitter electrode, a base electrode and a collector electrode;
a Zener diode connected between said emitter electrode and a point of reference potential;
a first capacitor connected between said emitter electrode and said point of reference potential;
a first resistor connected between said emitter electrode and a source of positive potential;
a second capacitor connected between said collector electrode and said base electrode; and
a second resistor connected between said collector electrode and said source of positive potential.

7. An analog signal detector and processor for use in a pulse modulated DC converter system comprising:
an attenuator;
a d-c reference source;
a summer circuit;
means to couple said reference source, said attenuator and said voltage divider to said summer circuit;
an integrator coupled to said summer circuit;
said attenuator comprising;
a first resistor connected to the output terminal of the attenuator; and
a second resistor connected to said output terminal of the attenuator and to a common reference potential of said analog signal detector and processor.

8. An analog signal detector and processor for use in a pulse modulated DC converter system comprising:
an attenuator;
a d-c reference source;
a summer circuit;
means to couple said reference source, said attenuator and said voltage divider to said summer circuit;
an integrator coupled to said summer circuit;
said integrator and said reference source comprising;
a transistor having an emitter electrode, a base electrode and a collector electrode;
a Zener diode connected between said emitter electrode and a point of reference potential;
a first capacitor connected between said emitter electrode and said point of reference potential;
a first resistor connected between said emitter electrode and a source of positive potential;
a second capacitor connected between said collector electrode and said base electrode; and
a second resistor connected between said collector electrode and said source of positive potential.

9. An analog signal detector and processor for use in a pulse modulated DC converter system comprising:
an attenuator;
a d-c reference source;
a summer circuit;
means to couple said reference source, said attenuator and said voltage divider to said summer circuit;
an integrator coupled to said summer circuit;
said reference source and said integrator comprising;
a common differential amplifier consisting of first and second transistors, each having an electrode first and second collector resistors and a common emitter circuit;
a Zener diode connected between the base electrode of the said second transistor and the reference node of said differential amplifier;
a resistor connected to a common source of positive potential and to the junction of said transistor base electrode and said Zener diode;
a first capacitor connected between said transistor base electrode and the reference node; and
a second capacitor connected between the base electrode and the collector electrode of said first transistor;
said attenuator comprising a first resistor connected to said base electrode of said first transistor and a second resistor connected between said base electrode and said common reference potential.

10. An analog signal detector and processor for use in a pulse modulated DC converter system comprising:
an attenuator;
a d-c reference source;
a summer circuit;
means to couple said reference source, said attenuator and said voltage divider to said summer circuit;
an integrator coupled to said summer circuit; and
a feedback loop for use in a DC converter system, said feedback loop comprising:
a feedback voltage divider;

a feedback amplifier;

means to couple said feedback voltage divider to said feedback amplifier; and means to couple said feedback amplifier simultaneously to said attenuator and said integrator.

11. An analog signal detector and processor as defined in claim 10 wherein said feedback voltage divider comprises:

a first resistor connected to the output terminal of said DC converter and to the output terminal of said feedback voltage divider;

a second resistor connected to said feedback voltage divider terminal and to the point of reference potential of said DC converter; and said feedback voltage divider output terminal being connected simultaneously to said attenuator and to said integrator.

12. An analog signal detector and processor as defined in claim 10 wherein:

the input terminal of said feedback amplifier is connected to the output terminal of said feedback voltage divider;

the output terminal of said feedback amplifier is connected to a third resistor; and the other terminal of said third resistor is connected simultaneously to said attenuator and said integrator.

13. An analog signal detector and processor as defined in claim 10 wherein said integrator and said reference source comprise:

a transistor having an emitter electrode, a base electrode and a collector electrode;

a Zener diode connected between said emitter electrode and a point of reference potential;

a first capacitor connected between said emitter electrode and said point of reference potential;

a first resistor connected between said emitter electrode and a source of positive potential;

a second capacitor connected between said collector electrode and said base electrode; and a second resistor connected between said collector electrode and said source of positive potential.

14. An analog signal detector and processor as defined in claim 10 wherein said integrator and said reference source comprise:

a common differential amplifier consisting of first and second transistors, first and second collector resistors and a common emitter circuit;

a Zener diode connected between the base electrode of the said second transistor and the reference node of said differential amplifier;

a resistor connected to a common source of positive potential and to the junction of said transistor base electrode and said Zener diode;

a first capacitor connected between said transistor base electrode and the network reference node; and a second capacitor connected between the base electrode and the collector electrode of said first transistor.

* * * * *